United States Patent

Lipson

[11] Patent Number: 5,468,533
[45] Date of Patent: Nov. 21, 1995

[54] MASKING MATERIAL

[75] Inventor: Ron B. Lipson, West Bloomfield, Mich.

[73] Assignee: Kwik Paint Products, Detroit, Mich.

[21] Appl. No.: 184,827

[22] Filed: Jan. 21, 1994

[51] Int. Cl.$^6$ ..................................................... C09J 7/02
[52] U.S. Cl. .............................. 428/40; 428/56; 428/194; 428/343; 428/354
[58] Field of Search .............................. 428/40, 56, 194, 428/343, 354

[56] References Cited

U.S. PATENT DOCUMENTS

| | | | |
|---|---|---|---|
| 3,396,838 | 8/1968 | Hawthorn | 206/59 |
| 3,581,884 | 6/1971 | Caldwell | 206/59 |
| 4,033,803 | 7/1977 | Coder | 156/71 |
| 4,054,698 | 10/1977 | Hamrah | 428/40 |
| 4,263,355 | 4/1981 | Sarkisian | 428/124 |
| 4,341,828 | 7/1982 | Stephens | 428/40 |
| 4,443,283 | 4/1984 | Sarkisian | 156/211 |
| 5,049,445 | 9/1991 | Arvidsson et al. | 428/352 |
| 5,354,614 | 10/1994 | Cox | 428/40 |

OTHER PUBLICATIONS

Scotch Brand No. 06349 Trim Masking Tape, 3M Automotive Trades Division, St. Paul, Minn. 55144-1000.

Primary Examiner—Jenna L. Davis
Attorney, Agent, or Firm—Gifford, Krass, Groh, Sprinkle, Patmore, Anderson & Citkowski

[57] ABSTRACT

A masking material includes a stiffened edge for easier insertion of the edge between closely abutting panels or surfaces as might be encountered in preparing a motor vehicle for painting or other such surface treatment. Preferably, a thin, flexible base layer includes an edge piece characterized in that it is flexible but more rigid than the base layer itself, enabling the edge piece to be inserted between closely spaced articles, with the remaining base layer being folded over the article to be masked, thereby providing an abrupt masking interface. One such article might, for instance, include a flush-type rubber molding incorporated into modern motor vehicles. In the preferred construction, the base layer comprises a tape with an adhesive surface, the edge piece being a flexible plastic strip which is narrower than the width of the base layer and adhered to the base layer using the adhesive surface. The non-adhesive surface of the base layer maybe thermally reflective, which may be beneficial in infrared heat drying, and a releasable layer may be provided to protect any adhesive surface which would otherwise be exposed.

14 Claims, 3 Drawing Sheets

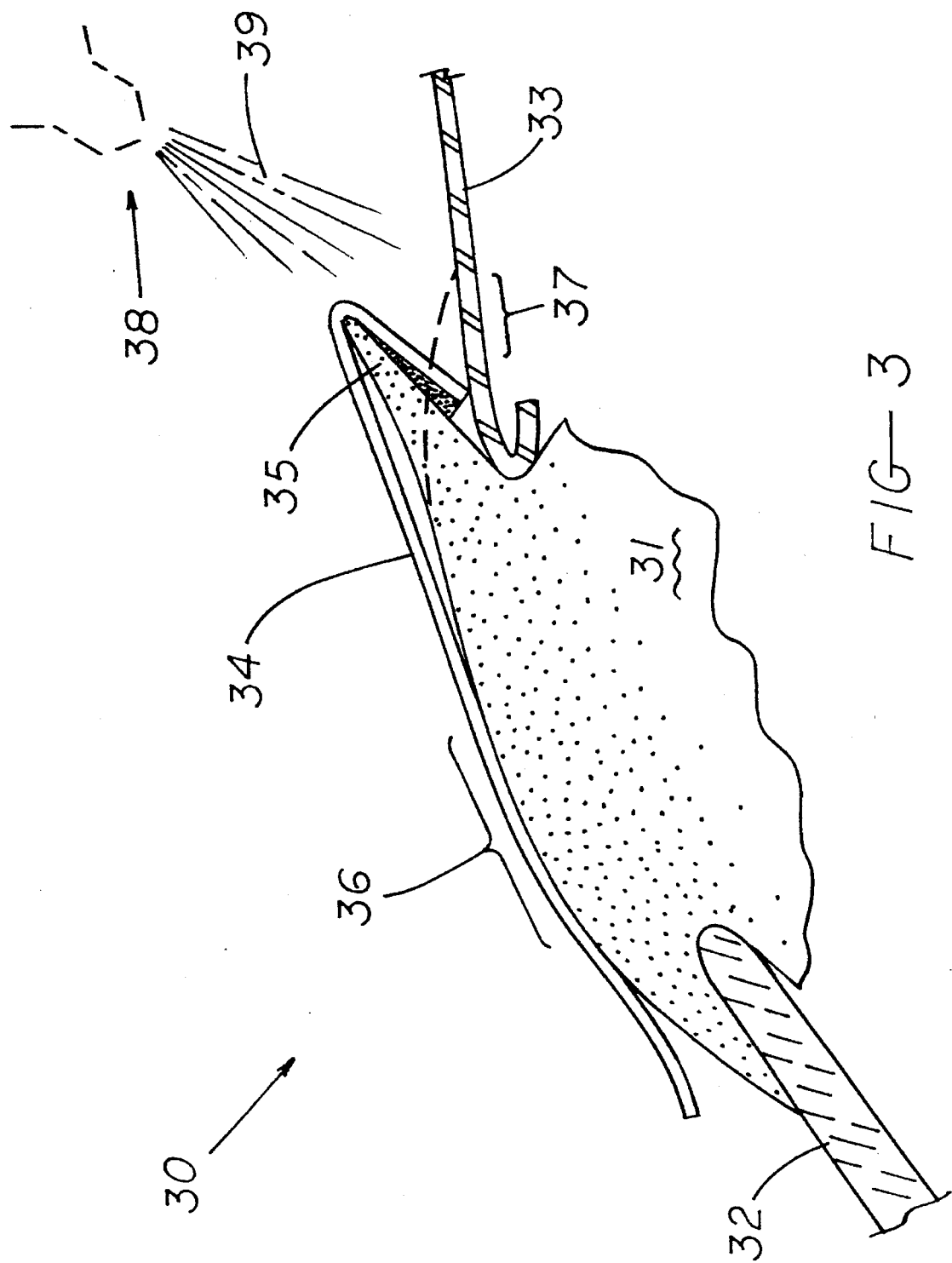

MASKING MATERIAL

FIELD OF THE INVENTION

This invention relates generally to masking material used in conjunction with spray painting or other surface treatments and, in particular, to a masking material having an edge which may more easily be wedged between closely abutting surfaces.

BACKGROUND OF THE INVENTION

High technology manufacturing processes now make it possible to assemble products with very close mechanical tolerances. Such precision is even possible with mass-produced items such as automobiles. In some cases, these high tolerances make repair and maintenance work on such vehicles increasingly demanding. For example, in terms of masking a vehicle for painting subsequent to repair work, such tight interfaces may render sharp, professional looking transitions difficult to achieve.

With older style rubber moldings, as might be found around vehicle windows, and so forth, the dimensions of the materials used, plus the relatively loose associated tolerances resulted in a straightforward application of masking materials such as masking tape. With these older raised-type moldings, masking tape could be readily applied to the larger surfaces involved, or easily wedged between the molding and the surface of the vehicle.

However, with new flush-type moldings, such approaches are made much more challenging. First, it is difficult to mask over newer moldings, since they are flush with surrounding surfaces, therefore leaving a paint line which is only as good as the amount of time used to prepare the area. It is also quite difficult to wedge masking tape under such flush-style moldings due to the exacting tolerances and the stickiness of the tape. Typically, by the time an individual pries apart the molding, the tape is already adhering to the wrong surface, which can lead to further problems, including physical damage to the molding or surrounding surfaces.

Thus, there remains a need for a somewhat more sophisticated masking material which can be used with these flush-style moldings or between any tightly spaced surfaces. An improved masking material or tape would enable at least one edge to be inserted between precisely matched articles, while remaining flexible enough to be folded over so as to provide adequate masking. At the same time, a solution should not be too complex or difficult to manufacture, as such masking materials must be easy to use and inexpensive to produce, as they are generally throw-away items.

SUMMARY OF THE INVENTION

The present invention is accordingly directed toward a simple yet economically effective masking material which may be used in conjunction with surface preparation associated with closely abutting articles, including flush-type moldings used in vehicular applications.

The present invention solves problems associated with inserting an edge of a masking sheet material between two closely spaced surfaces by providing a stiffened, non-adhesive edge along a sheet of flexible masking material, which may be provided in the form of an adhesive tape. In the preferred embodiment, the stiffened edge comprises an elongated strip of material disposed along at least one edge of a base layer, the strip being characterized in that it is flexible but more rigid than the base layer itself, thereby enabling a user of the base/strip combination to wedge the strip between two closely spaced surfaces and fold the remaining base layer over a surface to be masked. The inventive material is not constrained to a particular width and may therefore be provided in a convenient roll form.

In alternative embodiments, which may be used separately or in combination, the strip of material may be generally wedge-shaped with respect to its transverse cross section, the thicker portion of the wedge being outermost with respect to the longitudinal centerline of the tape, thereby enabling a molding to be lifted for surface treatment to an area otherwise covered. For example, the wedge may be used to lift a molding for painting beneath, thereby resulting in an abrupt transition. Additionally, the stiffened edge may include a structure allowing it to flex more easily in one dimension than in another, either to ease insertion or to better conform to a surface to be masked. One such structure of the stiffened edge may include an accordion-like pleating which enables the stiffened portion to more easily conform to smaller radii as might be found in conjunction with windshields, door handles, and so forth. Additionally, the face of the base layer exposed subsequent folding over may be reflective to radiation such as that typically delivered through infrared heating of the type used in paint drying operations.

Adhesive sections may further be protected with a peel-off release layer. In use, the edge with the stiff non-adhesive strip may be inserted between panels or surfaces before or after exposing the adhesive layer by removing this release material. Once the stiffened edge has been properly inserted, the base layer may be folded over and adhered to the surface desired to be protected during a surface treatment such as spray painting.

BRIEF DESCRIPTION OF THE DRAWINGS

FIG. 3 is a cross-sectional drawing which depicts an alternative embodiment of a masking material including a wedge shape to lift a flexible article such as a vehicular molding;

DETAILED DESCRIPTION OF THE PREFERRED EMBODIMENT

The present invention is a masking material which may be provided in sheet or roll form, and which includes, along at least one of its edges, a stiffening composition or separate strip of material which does not include an adhesive, thereby enabling this edge to be more easily inserted between tightly abutting surfaces prior to folding the material over surfaces to be masked. The invention is particularly useful in masking and painting operations involved with vehicle surface treatment or repair, and in particular, the stiffened edge may be more easily fitted between modern flush-type moldings as found around motor vehicle windows, trim pieces, and the like. However, application of the material is not restricted to such applications, and may be used in any instance where insertion of an edge of a protective flexible sheet is called for.

Figure 1:
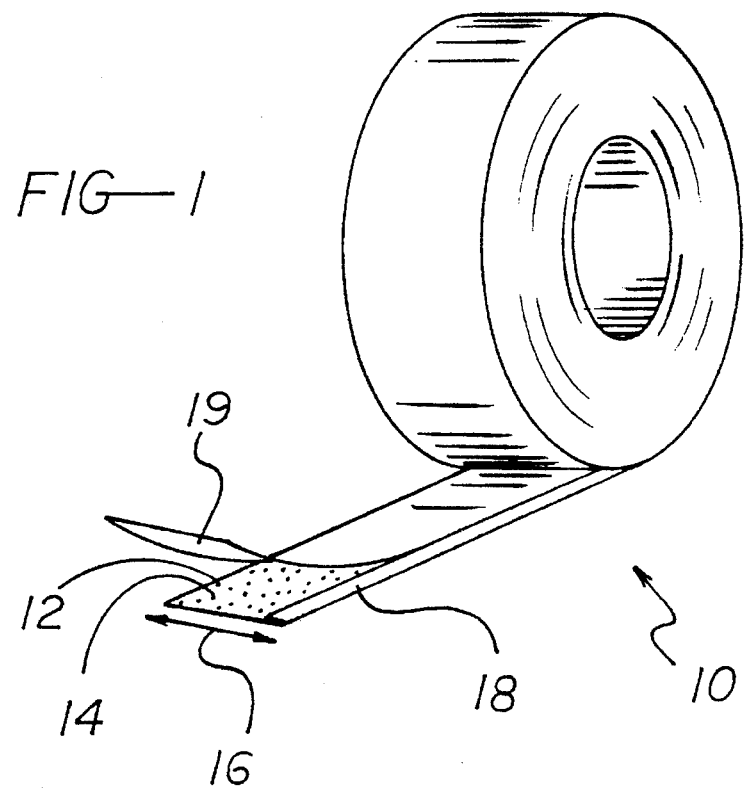
FIG. 1 is an oblique drawing of a roll of masking material constructed according to this invention including a separate edge stiffening piece oriented longitudinally along one edge of a base layer having an adhesive, and a removable release layer used to protect the adhesive.

FIG. 1 illustrates a preferred construction of the present masking material. A roll 10 of such material includes an elongated base layer 12 having an adhesive surface 14 and a width 16. Disposed along at least one of the two longitudinal edges of base layer 12 is a strip of material 18 which comprises a width less than width 16.

In the preferred embodiment, strip 18 is flexible yet comprised of a material which is more rigid or stiffer than base layer 12, and adhesive 14 on base layer 12 may be used at least partially for the attachment of strip 18. The overlap of strip 18 onto base layer 12 may be complete or only a portion of the width of strip 18 may overlap with the base layer 12, and still be in keeping with the inventive concepts described herein.

Preferred materials include a base layer constructed of polypropylene, chosen for its flexibility and heat resistant properties, and a stiffening piece 18 of Mylar, chosen for its relatively greater rigidity. However, it must be understood that the present invention is not restricted to particular materials, and hinges only on the exploitation of their advantageous properties. It should also be noted that although FIG. 1 depicts masking material in the form of a roll 10, such material may be provided in sheet form or in any two-dimensional section so long as one edge is stiffened with respect to the remainder of the sheet.

It is important that at least the stiffened edge not contain an adhesive, as such adhesive may confound the process of inserting the stiffened edge between the two closely abutting articles. Indeed, the base layer to which the stiffened edge is associated itself need not include an adhesive as it may still be advantageously folded over an area to be masked with or without the use of supplementary bonding materials. Furthermore, although FIG. 1 shows the preferred construction being that of a separate stiffening member applied to the edge of a base, it is also possible to simply stiffen the edge of a base material without the use of a separate strip or element. For example, in the case of certain plastics, an otherwise flexible base sheet may be treated with heat or radiation, ultraviolet radiation being one example, so as to change the rigidity along only the edge portion. It is also conceivable that the edge be painted or dipped in a material which would render it more rigid relative to the base sheet. All such techniques are in keeping with the present invention. Finalizing the reference to FIG. 1, a release layer 19 may further advantageously be added to the composite structure so as to protect the adhesive surface 14 of base layer 12. Such a release layer may be removed prior, or subsequent to, the insertion of the stiffened edge.

Figure 2:
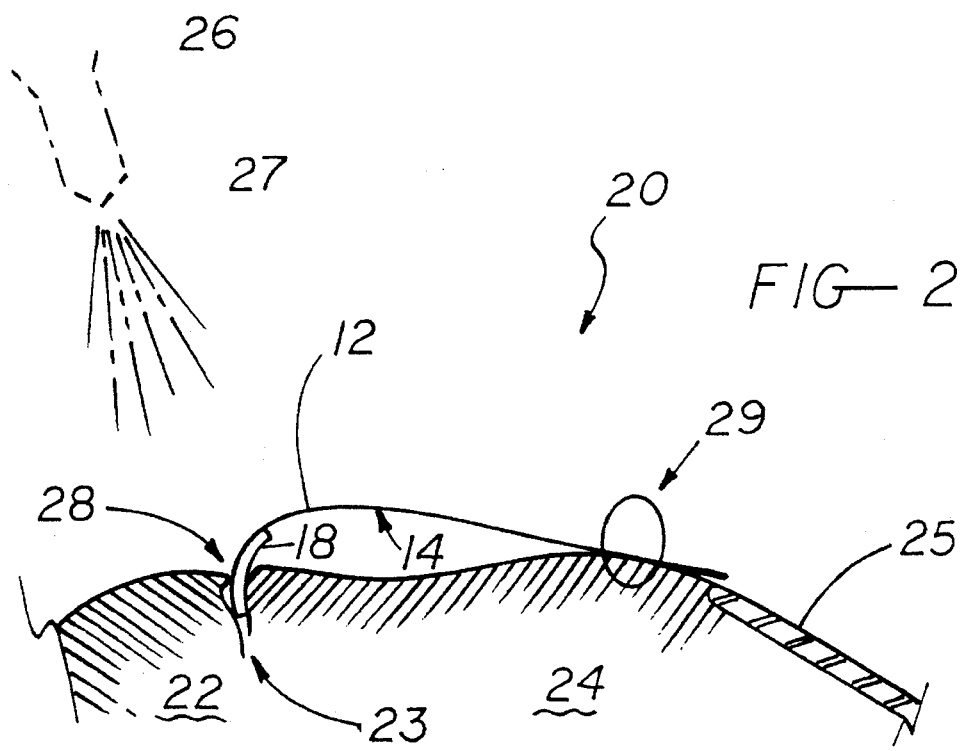
FIG. 2 is a cross-sectional drawing of the tape of FIG. 1 in use between a vehicular body panel and a flush-type rubber molding during a spray painting operation.

FIG. 2 is a cross-sectional drawing which illustrates how the material of FIG. 1 might be used in a typical spray-painting application, the overall configuration being indicated at 20. As shown, base layer 12 with adhesive surface 14 includes stiffening strip 18 which is wedged between two articles 22 and 24 in an interface region 23 located between the articles 22 and 24. As just one example, article 22 might represent some portion of a vehicular body panel to be painted or surface treated, whereas article 24 might represent some form of rubber molding between panel 22 and glass panel 25. Use of the present invention is not restricted to any of the shapes depicted in FIG. 2, as these may be of arbitrary shape and cross-section.

Once masking material base layer with stiffened edge 18 is inserted into the space 23, base layer 12 may be folded over and, if it includes adhesive layer 14, may be adhered to portions of the surface to be masked, such as that indicated in the vicinity of 29. In place, once spray head 26 producing spray 27 is directed toward the overall masked and unmasked surfaces, a very sharp edge 28 between painted and non-painted surfaces, respectively, may be produced.

Now turning to FIG. 3, there is shown generally at 30 an alternative embodiment of the present invention in use with respect to a flexible molding 31 between, for example, a glass panel or windshield 32 and a metal panel 33. In this alternative embodiment, a base layer 34 includes a wedge shaped portion 35, this wedge having its thickest thickness oriented outwardly from the center of the tape, such that when base layer 34 is folded over the molding 31 to be protected through masking in the vicinity of area 36, a portion of the surface of panel 33 in the vicinity of 37 is exposed, thereby enabling spray device 38 producing a spray 39 associated with a surface treatment such as painting, to reach that portion of the surface of panel 33 in the vicinity of 37 due to the lifting action of wedge 35. It should be noted that although the thicker portion of wedge 35 has a flat shape according to FIG. 3, this may be rounded, diamond shaped, etc. so long as the resulting shape is responsible for this lifting action, such that surface areas otherwise obscured by a flexible member may be lifted so as to expose surfaces otherwise hidden therebeneath.

Figure 4:
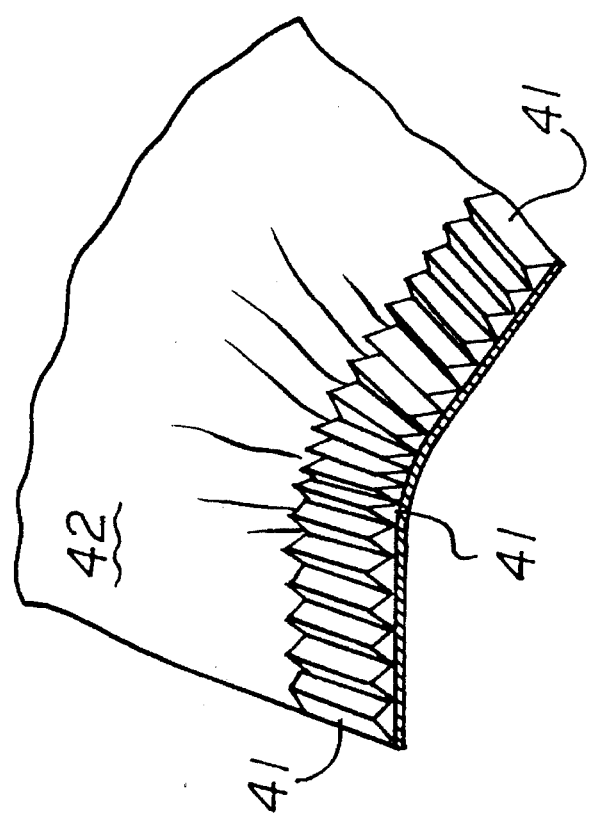
FIG. 4 is an oblique drawing including a cross section depicting an alternative construction of the stiffened edge, including an accordion-like structure for conformance with small radii.

In FIG. 4, there is shown a further alternative embodiment concerning the construction of the stiffened edge, in this case incorporating an accordion-like pleating 41 which enables the stiffened edge to more easily conform to smaller radii, as might be associated with moldings and so forth around windows, mirrors, and the like. This accordion structure of stiffened member 41 may also be oriented toward base layer 42, in which case the base layer may also additionally include such a corrugated or pleated feature such that it, too, may more easily conform to the smaller radii.

Figure 5:
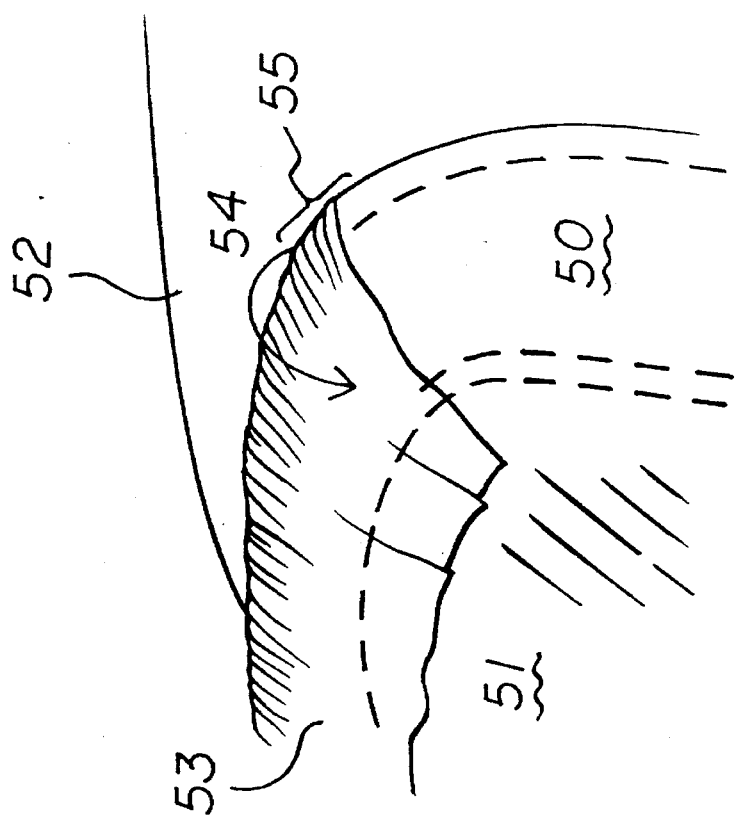
FIG. 5 shows the tape of FIG. 4 in place around a windshield.

FIG. 5 shows the alternative embodiment depicted in FIG. 4 in use around a molding 50 to seal an area around windshield 51 and a vehicle body panel 52. In this case, the alternative material which is shown as having been folded over in accordance with arrow 54 more easily conforms to the curve of this trim piece, for example in the vicinity of area 55, owing to the accordion-shaped pleating of the structure included in the stiffened edge.

In all of the constructions and instances just described, it should be noted that none of the material cross-sections or other dimensions are necessarily to scale, and that thicknesses, widths, and so forth may be tailored to meet particular applications. Moreover, in the event that it is desirable to apply heat to a treated or painted surface, the exposed surface of the base layer after folding it over an area to be masked may be made reflected or specular, or metalized so as to be less affected by such radiative heat treating, as might be produced by an infrared lamp, or the like.

Having thus described my invention, I claim:

1. In a masking tape having two outwardly facing surfaces and two spaced-apart longitudinal edges defining a width, the improvement comprising:

a longitudinal portion of the width of the tape, beginning at one of its edges, being stiffened as compared to the rest of the tape, the stiffened portion being generally wedge-shaped in transverse cross section, the thickest portion of the wedge being oriented away from the longitudinal centerline of the tape, one of the outwardly facing surfaces of the tape being entirely non-adhesive, including the longitudinally stiffened portion, the other outwardly facing surface of the tape including an adhesive but excluding the longitudinally stiffened portion.

2. The masking tape of claim 1, the non-adhesive surface being heat reflective.

3. The masking tape of claim 1, wherein the stiffened portion includes an accordion-like, pleated structure enabling it to more easily conform to small radii.

4. The masking tape of claim 1, further including a protective layer releasable from the outwardly facing surface of the tape including an adhesive portion.

5. In a masking tape having two outwardly facing surfaces and two spaced-apart longitudinal edges defining a width, the improvement comprising:

a longitudinal portion of the width of the tape, beginning at one of its edges, being stiffened as compared to the rest of the tape, one of the outwardly facing surfaces of the tape being entirely non-adhesive, including the longitudinally stiffened portion, the other outwardly facing surface of the tape including an adhesive but excluding the longitudinally stiffened portion, the longitudinal cross section of the tape including an accordion, pleated structure enabling the tape to more easily conform to small radii.

6. The masking tape of claim 5, the non-adhesive surface of the tape being heat reflective.

7. The masking tape of claim 5, wherein the longitudinally stiffened portion is generally wedge-shaped in transverse cross section, the thickest portion of the wedge being oriented away from the longitudinal centerline of the tape.

8. The masking tape of claim 5, further including a protective layer releasable from the outwardly facing surface of the tape including an adhesive portion.

9. A material for masking, comprising:

a thin, flexible base strip having first and second outwardly facing surfaces and two spaced-apart longitudinal edges defining a width; and a stiffening member having two edges, a length coextensive with that of the base strip and a width less than that of the base strip, the member being permanently adhered to the first surface of the base strip such that one edge of the member is substantially longitudinally aligned with one edge of the base strip, the remaining width of the first surface to which the member is not adhered including an adhesive, the longitudinal cross section of the stiffening member being pleated for conformance with small radii.

10. The masking tape of claim 9, the non-adhesive surface of the tape being heat reflective.

11. The masking tape of claim 9, wherein the stiffening member is generally wedge-shaped in transverse cross section, the thickest portion of the wedge being oriented away from the longitudinal centerline of the tape.

12. The masking tape of claim 9, further including a protective layer releasable from the outwardly facing surface of the tape including an adhesive portion.

13. A composite masking material having a stiffened edge to facilitate insertion between closely abutted curved surfaces, comprising:

a flexible elongated base sheet having first and second outwardly facing surfaces and two parallel opposing edges separated by a width dimension w1; and a flexible elongated strip of material permanently affixed to the base sheet, the strip having two edges defining a width dimension w2 which is less than w1, the strip of material being characterized in that it is more rigid than the base sheet, the width w1–w2 on only one of the outwardly facing surfaces including an adhesive, and at least the elongated strip including an accordion pleating structure, allowing the strip to be readily wedged between the closely butted curved surfaces.

14. A composite masking material having a stiffened edge to facilitate insertion between closely abutted surfaces, comprising:

a flexible elongated base sheet having first and second outwardly facing surfaces and two parallel opposing edges separated by a width dimension w1; and a flexible elongated strip of material permanently affixed to the base sheet, the strip having two edges defining a width dimension w2 which is less than w1, the strip of material being characterized in that it is more rigid than the base sheet, the width w1–w2 on only one of the outwardly facing surfaces including an adhesive, the thickness of the elongated strip varying as a function of its width with the thickest portion of the width being oriented toward the outermost edge of the base sheet, thereby allowing the strip to be readily wedged between the closely butted surfaces.

* * * * *